UNITED STATES PATENT OFFICE.

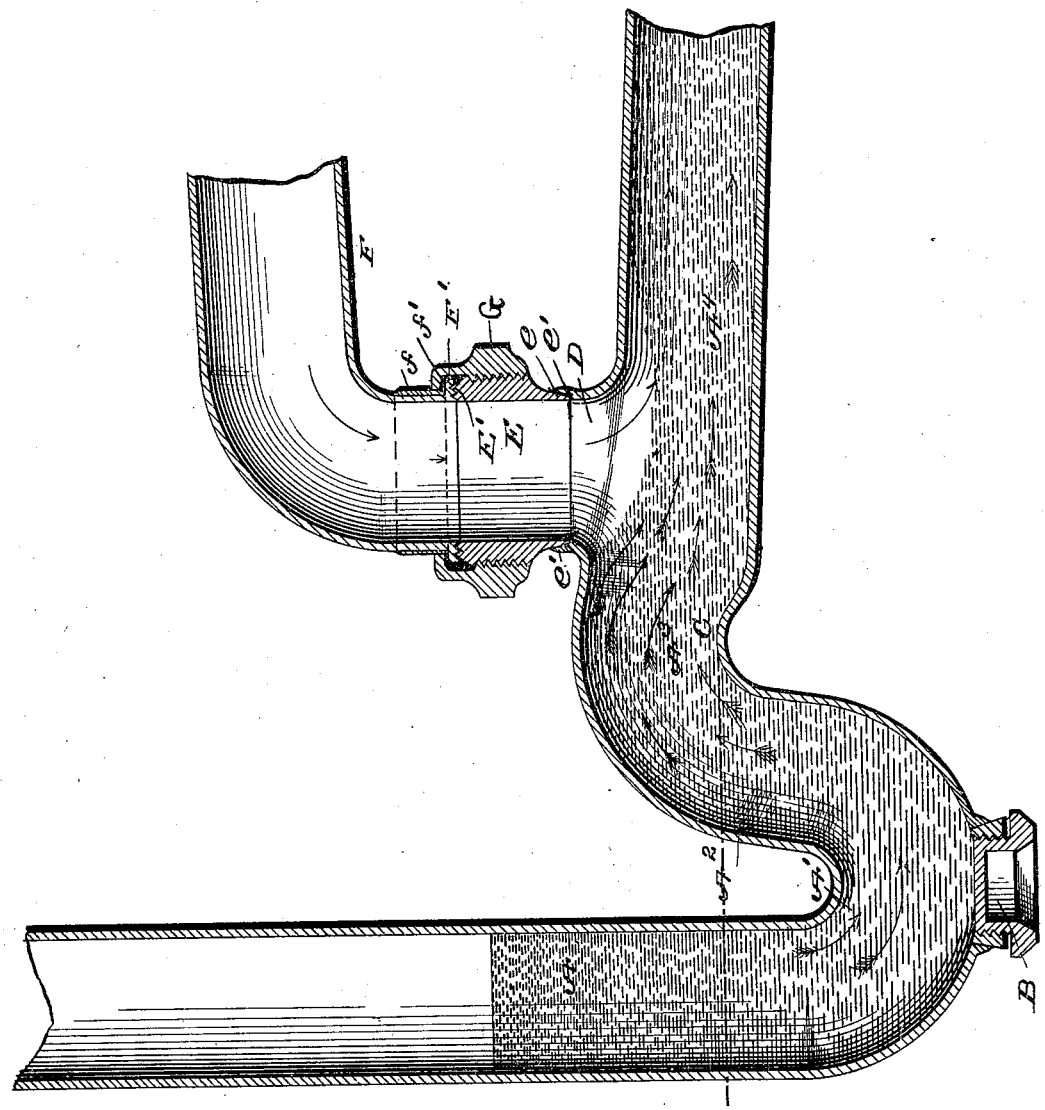

NICHOLAS BARRY, JR., OF MUSCATINE, IOWA.

PLUMBER'S TRAP.

SPECIFICATION forming part of Letters Patent No. 542,868, dated July 16, 1895.

Application filed May 24, 1894. Serial No. 512,325. (No model.)

*To all whom it may concern:*

Be it known that I, NICHOLAS BARRY, Jr., of Muscatine, in the county of Muscatine and State of Iowa, have invented certain new and useful Improvements in Plumbers' Traps; and I do hereby declare that the following is a full, clear, and exact description thereof, reference being had to the accompanying drawings, and to the letters of reference marked thereon, which form part of this specification.

This invention is an improvement in plumber's ventilated traps and connections therefor; and its objects are, first, to improve the construction of the trap, so that it will not choke readily and the foul matters passing through the trap will be kept out of the vent; second, to improve the connection between the trap and vent-pipe, such connection being also applicable for other plumbing-joints.

The invention will be clearly understood from the following description and claims, in connection with the accompanying drawings, in which—

Figure 1 is a longitudinal vertical section through the trap and vent. Fig. 2 is a detail sectional view of the connection prior to closing the joint thereof.

The shape of trap is obvious from drawings. It has a straight inlet-leg A, terminating in a semicircularly-curved trap or seal portion A', which continues in a short vertical discharge-leg $A^2$, parallel with leg A, but hardly more than an inch or so in length, and terminating in turn in an outwardly and downwardly bent portion $A^3$, which is very short, however, and continues in a straight discharge portion $A^4$, which is almost at right angles to leg A and is slightly lower than the upper part of portion $A^2$. It is dropped in practice about half the diameter of the pipe below such portion $A^2$ and the vent-pipe is connected therewith, as hereinafter described.

The most serious trouble with the ordinary plumbers' traps for waste-pipes now on the market are, first, liability to foul and choking, and, second, failure to keep vent open and clean.

My invention is designed to keep the trap clean and free from obstruction, to keep the vent-pipe fully open and clean, and to make a tight imperishable joint where a coupling-union is used on the ventilation-pipe connection.

The regular S traps now on the market have a cup-shaped trap-screw at bottom for cleaning purposes, which acts as a catch-basin for matters passing into the trap, thereby obstructing the water and retaining offensive matter. In my trap the trap-screw B is formed, as shown, so that when screwed home its top is flush with inside bottom of the trap, thereby preventing any catching or deposit of matters therein, so that the flushing of the trap will cleanse it.

As heretofore made the ventilation-pipes of traps were connected to the trap in such position that when it was flushed the water would rise up into the vent-pipe. In my trap the upper end of the discharge-leg is curved down, as at $A^2$, and the vent-opening is in the extension of the leg beyond and below the top of this downwardly-bent portion or "crown" of the trap, so that the connection of vent is below the crown and the outflowing current of water (indicated by the ordinary arrows in the drawings) is deflected downwardly by striking the downwardly-inclined inner wall C of the trap at top of discharge-leg, and instead of impinging against the side of vent-pipe and backing or rising therein it rushes under the vent and assists in creating a downward current of air therethrough, the air being carried along with the outflowing water, as indicated by the tailless arrows in the drawings.

When water with greasy matters in it rises in a vent-pipe a deposit is left on its walls, and as the vent-pipe is not flushed it will, in time, become stopped; but my trap is flushed throughout and the vent-pipe kept clear of obstruction by the water being directed downwardly and away from it.

To vent-opening D in part $A^3$ of the trap is attached a hard-metal threaded ring or nipple E, which is tapered at its lower edge, as at e, and the metal of the trap is spread over this tapered portion, thus forming a close joint between the nipple and the trap, which joint is wiped or soldered at e'. The upper edge of nipple E is provided with sharp annular rib or ribs E', as shown.

The vent-pipe F has a metallic collar f on its end, secured thereto by a wiped solder-joint, which collar has a short flange $f'$, and the end of pipe F is flanged over the collar $f$, as at F', forming an annular metallic packing-ring. The collar is thus entirely protected by the lead. The union-coupling or annular nut G is slipped over the vent-pipe, and, collar $f$ being retained by flanges $f'$ F', its lower threaded portion is screwed onto nipple E, and when screwed down hard the sharp rib E' is embedded into the lead flange F', thereby making a permanently gas-tight joint between the trap and vent-pipe, while the latter can be bent into any position desired without affecting the joint.

In my Patent No. 384,114 the lead is flanged over a brass nipple and a brass coupling is used. Others use a brass nipple soldered into the crown of trap and a brass coupling with a bent tail-piece of hard metal and place a leather washer between the face of nipple and tail-piece and connect the vent-pipe to tail-piece by a soldered or wiped plumber's joint, making a practically stiff or rigid connection, and after placing the vent-pipe in wall it has not sufficient spring or flexibility to enable a permanently tight joint to be made, and the leather washer dries out and lets gas escape. By my improvement the vent-pipe is always flexible, being in but one piece, and the gas-tight joint maintained so long as nut G is undisturbed.

The construction and advantages of the trap, wherein it differs from the well-known forms of lead traps, are sufficiently clear from the foregoing description, and therefore

What I claim as new is—

1. The herein described plumber's trap having a downwardly bent portion above and just beyond the water seal; a discharge leg extending from such portion substantially at right angles to the inlet leg, and lying below the top of such bent portion substantially as described, and a vent pipe connected to the top side of the discharge leg at the junction of the bent portion therewith and below the crown of such downwardly bent portion, so that the water passing into the discharge leg will be directed across the mouth of but away from the vent pipe, substantially as specified.

2. The combination of the nipple having one end ribbed and its other end tapered substantially as described, with the lead pipe having a hard metal flanged collar wiped on its end, and its end flanged over the flange of the collar, a union coupling fitting on said collar, and screwed onto the nipple, whereby the lead flange on the pipe constitutes a compressible washer interposed between the collar and nipple, substantially as described.

3. The herein described lead trap, having straight inlet leg A, U-shaped water seal, a discharge leg lying substantially at right angles to the inlet leg, and an inverted curved bend $A^3$, connecting the water seal and discharge leg all formed in one piece substantially as described; in combination with the nipple E, vent pipe F, and union coupling G, all constructed and arranged substantially as shown and for the purpose set forth.

In testimony that I claim the foregoing as my own I affix my signature in presence of two witnesses.

NICHOLAS BARRY, JR.

Witnesses:
JOHN POEHLS,
C. E. GIRMETT.